Patented July 18, 1950

2,515,579

UNITED STATES PATENT OFFICE 2,515,579

HEATING APPARATUS

Harold P. Allen, Mansfield, Ohio, assignor to Westinghouse Electric Corporation, East Pittsburgh, Pa., a corporation of Pennsylvania Application October 27, 1948, Serial No. 56,899

4 Claims. (Cl. 219—37)

This invention relates to electrical heating units in general but more particularly to electric range surface heating units.

It is necessary for good cooking results, to provide a surface heating unit in which the vessel supporting surface is level, that is, disposed in the horizontal plane. For example, in the frying of meats or other foods, if the unit is inclined, the hot grease will run to one side of the skillet, causing the food to be cooked unevenly or even scorched.

Most electric ranges on the market today are provided with a plurality of surface heating units, each of which is mounted and supported individually in the top platform of the range. For various manufacturing reasons it is unlikely that all the surface heating units in a finished range will lie in a horizontal plane. Also, in the installation of the range, an uneven floor may make some adjustment necessary to insure uniform cooking results. However, one common adjustment is not sufficient to correct any variations which may be present in the surface heating units. Each unit must be treated individually as required.

In view of the above, it is an object of this invention to provide a means for individually leveling range surface heating units.

It is a further object of this invention to provide a means for leveling a range surface heating unit which is inexpensive to manufacture and simple to employ.

Another object is to provide a surface heating unit leveling adjustment means which may be utilized after the range is installed to meet varying conditions, such as an uneven floor.

These and other objects are effected by the invention as will be apparent from the following description and claims taken in connection with the accompanying drawings, forming a part of this application, in which:

Figure 1:
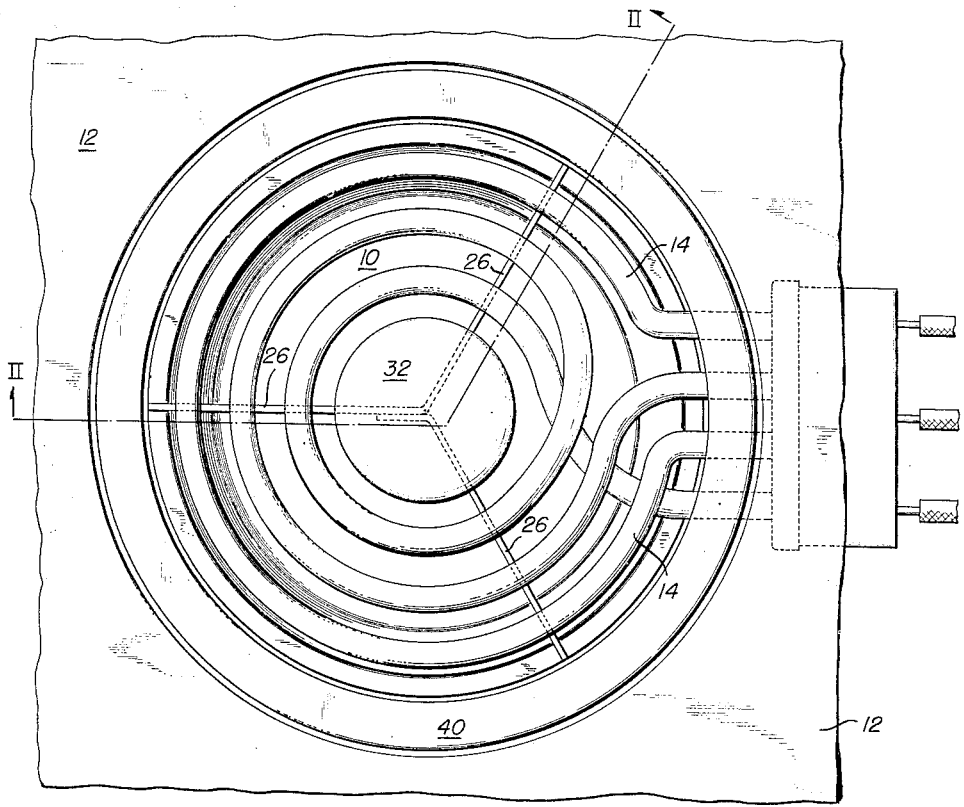
Fig. 1 is a top plan of an electric surface heating unit.
Figure 2:
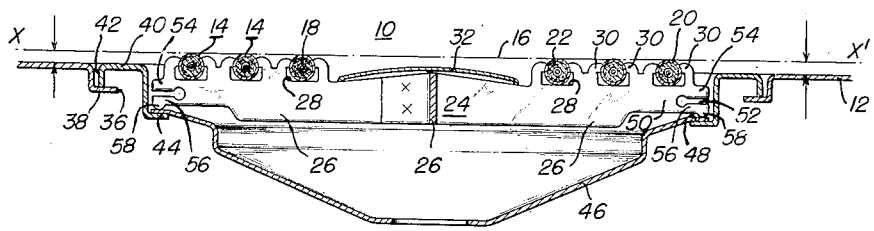
Fig. 2 is a vertical cross section taken on line II—II of Fig. 1.

Referring to the drawings in detail and especially to Figs. 1 and 2, there is shown an electric surface heating unit generally designated 10, disposed in a range platform 12. Only a small portion of the platform and only one heating unit are shown; although it must be understood that any number of surface heating units may be provided as desired, and the platform may be of any size and shape.

The heating unit may have any type of heater desired, although I have shown it as having a plurality of sheathed heaters 14 wound in a flat spiral to provide a flat vessel supporting surface 16. These heaters have a helically wound resistance element 18 disposed axially of a metallic tubular sheath 20 and imbedded in a highly compacted powdered refractory insulating material 22. The heaters are supported by an underlying framework or spider 24 having a plurality of radially disposed arms 26, two of which may be integrally formed and the third fastened to the center thereof as by spot welding (denoted by X's). Each of the arms may be formed of sheet metal and disposed with its large cross-sectional dimension in a vertical plane to resist bending in a vertical plane. The upper edges of the arms 26 are provided with spaced notches 28 in which the heaters 14 are located. A plurality of upstanding prongs 30, defined in part by the adjacent notches, are bent, as by swaging, into gripping engagement with the heaters 14, to prevent distortion of the surface 16 which would otherwise be caused by thermal stresses induced by heating and cooling. A decorative escutcheon plate 32 may be fastened in the central upper portion of the spider 24 to add to the appearance of the unit.

The manner of mounting the heating unit 10 in the range platform 12 will now be described. The platform has an opening 36 defined by a peripheral depending flange 38. A support ring 40 is nested within the opening 36 and has its outer marginal portion turned downwardly to form a lateral flange 42 which rests on the platform flange 38. The inner marginal portion of the support ring is turned downwardly and inwardly to form a flange 44 similar to the platform flange but disposed in a lower position.

A pan-like reflector 46, of any desired shape and having a peripheral flange 48, is disposed below the heating unit. The reflector is supported at its flange by the support ring flange 44 and substantially fills the opening in the ring, thereby catching any food spillage incurred while cooking and also serving to reflect radiated heat from the heaters 14 upwardly as is well known in the art.

The heating unit is disposed within the ring, the arms 26 having their terminal portions 50 resting on the reflector flange 48. Since the terminal portions may be identical, only one will be described in detail. A substantially horizontal slot 52 is provided in terminal portion 50, the edges of the slot in part defining an upper tongue portion 54 and a lower tongue portion 56. The lower tongue is narrower and more easy to bend than the upper tongue, for a purpose which will subsequently be described. The lower tongue 56 has a depending projection 58 of circular shape which acts as a bearing point and supports the full weight of the heating unit 10.

Figure 3:
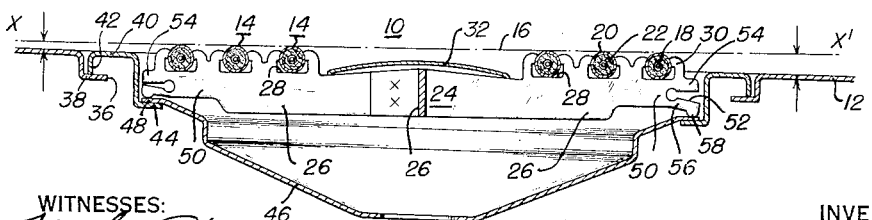
Fig. 3 is a view similar to Fig. 2 but showing the heating unit adjusted to lie in the horizontal plane.

It will be apparent that if the range platform 12 is parallel to the horizontal plane X—X' as shown in Fig. 2, and if the heating unit 10 is properly constructed, no adjustment of the terminal tongues 50 is necessary to make the cooking surface 16 level. However, the range platform 12 may not be parallel to the horizontal plane X—X', but may list to the right as shown in Fig. 3. To correct this condition, the heating unit 10 is lifted out of the ring 40 and the lower tongue 56 on the right side is bent downwardly as necessary to level the unit. This operation may be performed by inserting a screw driver or other tool in the slot 52 and using it as a lever. Since the lower tongue 56 is thinner than the upper tongue 54, all the bending will occur in the lower tongue, the upper tongue acting only to brace the tool.

If the above adjustment is not sufficient to correctly level the unit, the lower tongue on the left side of the unit may be bent upwardly as necessary to lower the left side of unit. This operation may be accomplished by gripping the upper and lower tongue with pliers. As before, the lower tongue will yield upwardly. It will be noted that the projection 58 will abut the reflector flange and provide the clearance necessary between the reflector 46 and the spider 24 for maximum adjustment.

It has been found that slotting two of the three arms 26 is sufficient to correctly level a unit which lists in any radial direction. Also, the width of the slots 52 may be determined by the maximum adjustment necessary to be obtained.

While I have shown my invention in but one form, it will be obvious to those skilled in the art that it is not so limited, but is susceptible of various changes and modifications without departing from the spirit thereof.

What I claim is:

1. An electrical surface heating unit comprising a heater having a top surface adapted to support a cooking vessel and a support structure underlying and fastened to said heater, said structure having a plurality of radially disposed arms adapted to be supported at their terminal portions, said arms having a cross section in which the vertical axis is substantially greater than the horizontal axis to resist bending in a vertical plane, at least one of said terminal portions having a substantially horizontal slot extending inwardly from its outer end to divide the same into an upper terminal portion and a lower terminal portion, said lower terminal portion being adapted to rest on a supporting surface and being bendable vertically to permit adjusting said top surface to a horizontal plane.

2. A range comprising a platform and a surface heating unit, said platform having an opening and said unit being disposed therein, said platform having a member disposed below said opening for supporting said heating unit, said unit comprising a heater having a top surface adapted to support a cooking vessel and a support structure underlying and fastened to said heater, said structure having a plurality of outwardly disposed arms supported at their terminal portions by said member, said arms having a cross section in which the vertical axis is substantially greater than the horizontal axis to resist bending in a vertical plane, at least one of said terminal portions having a substantially horizontal slot extending inwardly from its outer end to divide the same into an upper terminal portion and a lower terminal portion, said lower terminal portion resting on said member and being bendable vertically to permit adjusting said top surface to a horizontal plane.

3. An electrical surface heating unit comprising a heater having a top surface adapted to support a cooking vessel and a support structure underlying and fastened to said heater, said structure having a plurality of outwardly disposed arms adapted to be supported at their terminal portions, at least one of said terminal portions having a slot extending inwardly from its outer end to divide the same into two terminal portions, one of said last-mentioned terminal portions being disposed below the other thereof and adapted to rest on a supporting surface, and being bendable vertically to permit adjusting said top surface to a horizontal plane.

4. A range comprising a platform and a surface heating unit, said platform having an opening and said unit being disposed therein, said platform having a member disposed below said opening for supporting said heating unit, said unit comprising a heater having a top surface adapted to support a cooking vessel and a support structure underlying and fastened to said heater, said structure having a plurality of outwardly disposed arms supported at their terminal portions by said member, at least one of said terminal portions having a slot extending inwardly from its outer end to divide the same into two terminal portions, at least one of said last-mentioned terminal portions being disposed below the other thereof and resting on said member and being bendable vertically to permit adjusting said top surface to a horizontal plane.

HAROLD P. ALLEN.

REFERENCES CITED

The following references are of record in the file of this patent:

UNITED STATES PATENTS

| Number | Name | Date |
| --- | --- | --- |
| 1,018,150 | Adams | Feb. 20, 1912 |
| 2,271,977 | Hjelmgren | Feb. 3, 1942 |
| 2,283,324 | Faber | May 19, 1942 |
| 2,414,667 | Price | Jan. 21, 1947 |
| 2,442,659 | McCormick | June 1, 1948 |